United States Patent [19]

Stevens

[11] 3,919,703

[45] Nov. 11, 1975

[54] FAULT DETECTION SYSTEM FOR TRANSDUCERS

[75] Inventor: Curtis E. Stevens, Irvine, Calif.

[73] Assignee: Bertea Corporation, Irvine, Calif.

[22] Filed: Apr. 8, 1974

[21] Appl. No.: 458,979

[52] U.S. Cl.............. 340/253 R; 340/181; 340/199
[51] Int. Cl.² ........................................ G08B 21/00
[58] Field of Search ........... 340/253, 255, 198, 199, 340/181

[56] References Cited
UNITED STATES PATENTS

| | | | |
|---|---|---|---|
| 1,809,637 | 6/1931 | Moulton | 340/253 N |
| 3,072,858 | 1/1963 | Siskind | 340/253 N X |
| 3,313,984 | 4/1967 | Hupp | 340/255 UX |
| 3,636,541 | 1/1972 | Genuit et al. | 340/255 X |

*Primary Examiner*—John W. Caldwell
*Assistant Examiner*—Daniel Myer
*Attorney, Agent, or Firm*—Gordon L. Peterson

[57] ABSTRACT

A fault detection system including first and second transducers adapted to receive alternating current, a common conductor coupled to the transducers, and a failure detector. The alternating current from the transducers is substantially oppositely phased so that, under normal operating conditions, the current level on common conductor is relatively low. When a failure in one of the transducers occurs, the current level on the common conductor increases at least to a predetermined level. The failure detector is responsive to the current level on the common conductor rising to such predetermined level to provide a failure signal.

11 Claims, 3 Drawing Figures

FAULT DETECTION SYSTEM FOR TRANSDUCERS

BACKGROUND OF THE INVENTION

Various systems including aircraft control systems employ multiple transducers. The transducers may respond to the same or different variable conditions. For example, a transducer in an aircraft control system may provide an electrical signal which is indicative of the position of a movable element. One such transducer is shown in common assignee's U.S. Pat. No. 3,701,136.

It is often necessary or desirable to detect failures in transducers. Although various failure detection systems are known, none of these is suitable for transducers.

For example, U.S. Pat. No. 3,643,248 issued to Schott shows a failure detection system for automobile headlights. The current supplied to one of the headlights is passed through a first coil in one direction and the current to the other of the headlights is passed through a second coil in the opposite direction. When both lights are operative, the two electromagnetic fields created by these coils cancel. However, when one of the headlights fails, the electromagnetic field created by the current flow to the operative headlight closes a reed switch which in turn activates a warning device.

The patented system in not adaptable to transducers in that the power requirements of the reed switch are too high in relation to the power required for transducer operation. In addition the reed switch is fragile and has relatively large tolerances. The patented device is also not adapted for use with alternating current.

SUMMARY OF THE INVENTION

The present invention provides a novel fault detection system for transducers which generally overcomes the problems noted above. In accordance with the present invention, first and second transducers are appropriately coupled to each other and to a failure detector which compares each of the tranducers to the other.

One feature of the invention is that the current received by the failure detector from the two transducers is substantially oppositely phased alternating current. So long as both of the transducers are functioning normally, the oppositely phased alternating currents tend to cancel thereby providing a relatively low current level at the failure detector. However, if a failure occurs in either of the transducers, the alternating or direct current level at the failure detector increases at least to a predetermined level. The failure detector is responsive to this increased current level to provide a failure signal. As used herein failure means any condition which prevents proper transducer operation such as power loss, open or short circuit of the transducer leads and internal transducer disorders.

By using substantially oppositely phased alternating current, cancellation of currents is obtained automatically without the addition of coils or other special elements. In addition, inexpensive and reliable threshold detection means can be used to detect the predetermined current level. Direct current of opposite polarity could be utilized in lieu of oppositely phased alternating current; however, this would make it necessary to provide more complex and expensive circuitry to separate the signal current from exitation current.

If desired, oppositely phased alternating current may be applied to each of the transducers. Alternatively, in phase alternating current may be applied to the transducers and then appropriately inverted for one of the transducers prior to being applied to the failure detector. Although it is preferred that the alternating current from the two transducers be precisely 180° out-of-phase, obviously this is not essential. Rather, it is only necessary that the currents oppose each other to the extent necessary so that failure of one of the transducers will produce a readily detectible change in the current level.

The failure signal provided by the failure detector may be utilized in a variety of different ways. For example, the failure signal may actuate an indicator or alarm indicating a failure of one of the transducers. Alternatively, or in addition thereto, the failure signal may, for example, switch in a back-up system or another transducer to compensate for the transducer which has failed.

The use of oppositely phased alternating current can be advantageously implemented by providing a common conductor coupled to both of the transducers and to the failure detector. A failure will produce either a relatively large change in the direct current amplitude or the alternating current amplitude on the common conductor. With this arrangement, the failure detector can be in the form of a threshold detector for detecting the AC and the DC signal level on the common conductor. This type of detection is inexpensive, simple, and reliable. In addition, this type of threshold detector can be directly coupled to the common conductor and no inductive coupling or similar elements are required.

A transducer provides an electrical signal which varies in accordance with the variable condition being monitored, and this signal must be separated from the power applied to the transducer. This can be accomplished, for example, by separating the signal current from the power or exitation current. This function can be accomplished with an appropriate signal detector.

The coexistence of signal current and power current presents a special problem for transducer monitoring. Specifically, when the two transducers are not monitoring redundant systems, the signal currents from the two transducers will vary independently of each other. In order that the independent variation in these signals does not provide a current threshold which is indicative of a failure, the signal current should be very small in relation to the exitation current. Similarly, the exitation currents for the two transducers should bear known relationships to each other and are preferably closely matched. In other words, under normal operation of the two transducers, it is desirable to be able to predict, within reasonable tolerances, the phase and level of the current applied to the common conductor.

Although its application is not necessarily so limited, the present invention is particularly adapted for detecting faults on two wire transducers. A two-wire transducer is a transducer having only two leads. A two-wire transducer is shown in common assignee's U.S. Pat. No. 3,701,136.

The invention can best be understood by reference to the following description taken in connection with the accompanying illustrative drawing.

DESCRIPTION OF THE PREFERRED EMBODIMENT

Figure 1:
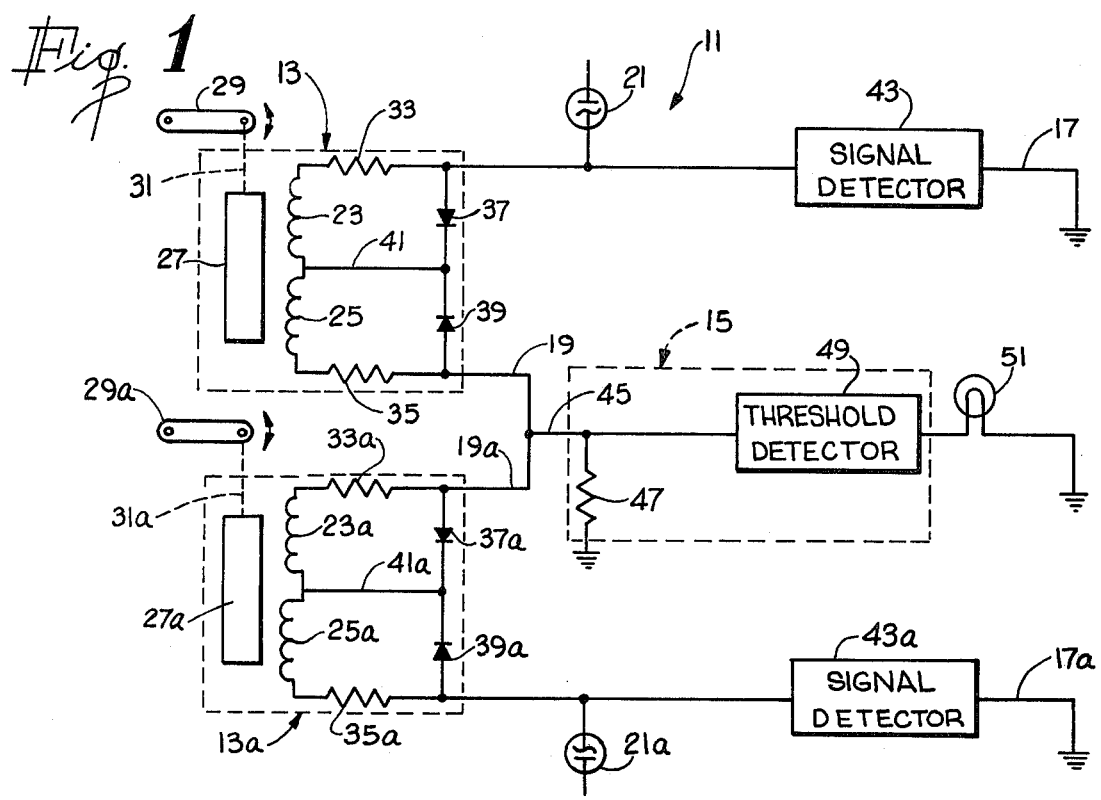
FIG. 1 is a schematic circuit diagram of one form of fault detection system constructed in accordance with the teachings of this invention.

FIG. 1 shows a fault detection system 11 including transducers 13 and 13a and a failure detector 15. Although it is not necessary, in the embodiment illustrated, the transducers 13 and 13a are identical. Portions of the transducer 13a corresponding to portions of the transducer 13 are designated by corresponding reference numerals followed by the letter a.

Although the transducers 13 and 13a could be of various different constructions, preferably each of them is of the two-wire type shown by way of example in the above-mentioned U.S. Pat. No. 3,701,136. The transducer 13 is of the two-wire type in that it has only two leads in the form of leads 17 and 19 extending thereto.

The fault detection system 11 also includes ac power sources 21 and 21a for supplying power to the transducers 13 and 13a, respectively. The power sources 21 and 21a are preferably identical. The current supplied by the power sources 21 and 21a is 180° out of phase. The voltage rating of the power sources 21 and 21a can be selected to suit system requirements. For purposes of illustration, the power sources 21 and 21a may have a 26 volt rating.

The transducer 13 includes windings 23 and 25 connected across the leads 17 and 19. The inductive reactance of the windings 23 and 25 can be varied by moving a movable core 27. The position of the core 27 is a function of the position of a movable element 29, and this relationship can be established by any suitable means such as a mechanical linkage 31 drivingly connecting the element 29 to the movable core 27. The movable element 29 may be any member, the position of which it is desired to monitor. The inductive reactance of the windings 23 and 25 is varied inversely by moving the core 27.

The inductive reactance of the windings 23 and 25 can be varied in many other ways, and the manner shown in FIG. 1 is purely illustrative. For example, the core 27 may be fixed in position, and the magnetic permeability of the core can be varied in response to movement of the movable element 29. This can be accomplished, for example, by a rotary core or a flexing diaphragm.

Resistors 33 and 35 are provided in series with the windings 23 and 25, respectively. Each of the resistors 33 and 35 perform a current limiting function.

Opposed diodes 37 and 39 are coupled across the leads 17 and 19. Each of the diodes 37 and 39 may be any nonlinear rectifying device. A conductor 41 extends from a location intermediate the windings 23 and 25 to a location intermediate the diodes 37 and 39.

The transducer 13 provides two primary, unidirectional, conductive paths between the leads 17 and 19. Thus, with current flowing in one direction, current flows through the first primary path, i.e., from the lead 17 through the diode 37, the conductor 41, the winding 25 and the resistor 35 to the lead 19. There is also some minor current flow around the diode 37 through the resistor 33 and the winding 23. Conversely, with current flowing in the opposite direction, current flows through the second primary path, i.e., from the lead 19 through the diode 39, the conductor 41, the winding 23, and the resistor 33. There is also some minor current flow around the diode 39 through the resistor 35 and the winding 25.

The amount of current flowing through each of the primary paths is a function of the impedance of such path. At the zero or null position of the movable element 29, the impedances through these two primary paths are equal. Ideally, this can be accomplished if the resistances of the resistors 33 and 35 are identical, the windings 23 and 25 are identical, and the core 27 is similarly positioned relative to the windings. Practically, however, it may be necessary to adjust the resistances of the resistors 33 and 35 in order to make the impedances of the two primary paths equal in the null position.

As shown and described more completely in the aforementioned U.S. Pat. No. 3,701,136, in the null position the current flow through each of the primary paths between the leads 17 and 19 is equal and can be represented by a sine wave. This causes the DC or average current to be zero, and in the embodiment illustrated this is indicative of the null position of the movable member 29.

However, if the movable element 29 is pivoted counterclockwise as viewed in FIG. 1, the core 27 is moved upwardly to increase the inductive reactance of the winding 23 and reduces the inductive reactance of the winding 25. This increases current flow through one of the primary paths and decreases it through the other primary path with the result that the DC current level assumes a value indicative of the position of the movable element 29. The core 27 is not saturated and, therefore, the change in inducitve reactance of the windings 23 and 25 is directly proportional to the movement of the core and the movable member 29. Accordingly, the transducer 13 provides a linear output which is a function of the position of the core 27 and the movable member 29. Moreover, the polarity of the DC signal indicates the direction of movement of the core 27 and the movable element 29 from the null position.

The DC current signal or information signal must be separated from the AC or carrier. This is accomplished in the embodiment illustrated by a signal detector 43. The signal detector 43 may be of the same type shown in U.S. Pat. No. 3,701,136. The DC signal at the signal detector 43 may be visually displayed and/or utilized to operate other apparatus.

The transducer 13a operates in the same manner as the transducer 13. Although the cores 27 and 27 could be controlled by the sme movable element, in the embodiment illustrated, the movable elements 29 and 29a are separate members movable independently of each other. Accordingly, the DC signal provided by the transducer 13a bears no known relationship to the DC signal produced by the transducer 13.

Figure 2:
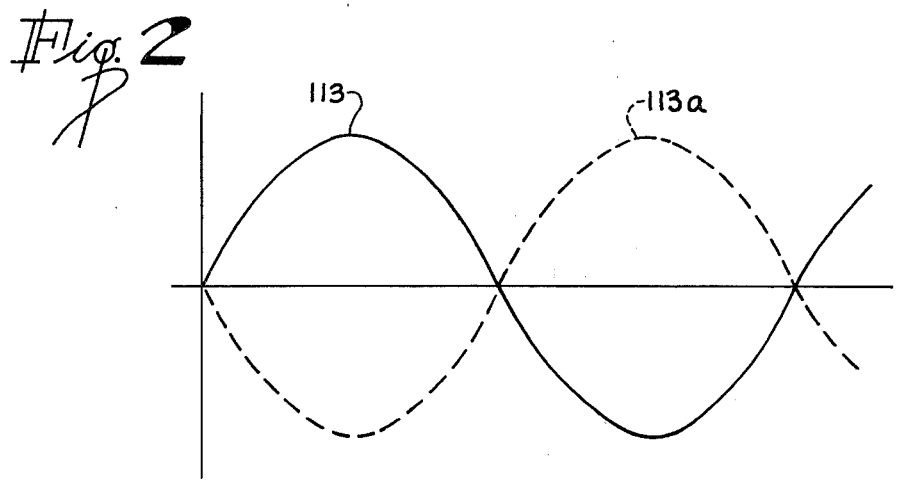
FIG. 2 is a plot illustrating the current supplied to the failure detector versus time when both of the transducers are operating properly.

The failure detector 15 compares the transducers 13 and 13a to determine whether or not there has been a failure in one of them. To this end, a common conductor 45 is coupled to the failure detector 15 and to the transducers 13 and 13a. Accordingly, the alternating current from the transducers 13 and 13a is impressed on the common conductor 45. FIG. 2 shows the currents impressed on the common conductor 45. Thus, alternating current represented by the curves 113 and 113a are fed to the common conductor 45 from the transducers 13 and 13a, respectively. Because these currents are 180° out of phase they tend to cancel each other out to thereby provide a relatively low current level to the failure detector 15. With both of the movable elements 29 and 29a at the null position and under ideal conditions, the currents represented by the curves 113 and 113a would be equal and 180° out of phase. Under these conditions, both the alternating and direct current levels at the common conductor 45 would be zero.

However, various practical considerations such as the tolerances of the components of the transducers 13 and 13a and gain variations due to unequal bridge action make it inevitable that there will be some alternating current level and direct current level other than zero on the common conductor 45. In addition, the DC signal current provided by the transducers 13 and 13a resulting from movement of the elements 29 and 29a will introduce an additional disparity in the currents from the two transducers. In this connection, it is important that the signal current, i.e., the DC signal current provided by the transducers 13 and 13a be small compared to the alternating current provided by the power sources 21 and 21a. By way of example and not by way of limitation, the DC signal current may be plus or minus 0.2% of the alternating current provided by the power sources 21 and 21a. In summary, all of the various factors making the currents represented by curves 113 and 113a unequal should produce a current on the common conductor 45 which is close to a reference level which is illustrated by way of example as zero in FIG. 2.

The failure detector 15 is adapted to detect a large or catastrophic failure such as an open circuit in either of the transducers 13 or 13a. The failure detector 15 will not respond to the relatively small DC signal resulting from normal operation of the transducers 13 and 13a.

The failure detector 15 in the embodiment illustrated includes a sensing resistor 47 coupled between the common conductor 45 and ground and a threshold detector 49. The threshold detector 49 must provide a failure signal in response to either a DC current signal of a first predetermined level or an AC current signal of a second predetermined level on the common conductor. When a direct current is impressed on the sensing resistor 47, the resultant voltage drop across the sensing resistor is detected by the threshold detector 49. As this voltage drop is proportional to the current impressed on the sensing resistor 47, the threshold detector 49, in effect, provides the failure signal in response to the direct current on the common conductor 45 reaching at least a predetermined level. Similarly, the threshold detector must provide a failure signal in response to a high amplitude AC current signal on the common conductors. Threshold detectors of this type are known and may be, for example, an appropriate AC meter relay.

Figure 3:
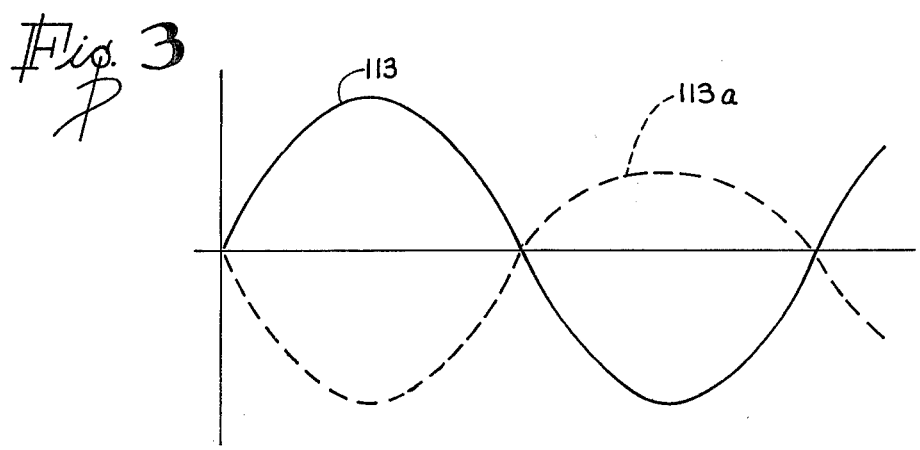
FIG. 3 is a plot illustrating the current supplied to the failure detector versus time when one of the transducers malfunctions in a particular way.

FIG. 3 shows the effect on current impressed on the common conductor 45 resulting from an open circuit at the diode 39a. With an open circuit at the diode 39a, during the positive portion of the cycle, current from the power source 21a passes through the resistor 35a, the windings 25a and 23a, and the resistor 33a. With no open circuit, the current would pass through the substantially resistance-less diode 39a rather than through the resistor 35a and the winding 25a. The net effect is a substantial reduction in the current fed to the common conductor 45 from the transducer 13a during the positive portion of the cycle as shown in FIG. 3. This impresses a relatively large DC current on the sensing resistor 47 and the resulting voltage drop across the sensing resistor is detected by the threshold detector 49. The threshold detector 49 is set so that it will not respond to voltage drops across the sensing resistor 47 which occur during normal operation; however, the threshold detector will respond to voltage drops of a magnitude that are brought about by an open or short circuit in one of the transducers 13 and 13a.

In the embodiment illustrated, the failure signal from the threshold detector 49 is utilized to energize a warning light 51. However, the failure signal may be employed to actuate any form of indicator or alarm device and/or to perform various other functions such as actuation of other equipment.

Any failure which would result in substantial alteration of one half of either of the signals represented by the curves 113 or 113a would produce a DC current level which the threshold detector 49 would detect in the above-described manner. Most failures of this type will occur within one of the transducers 13 and 13a.

However, some failures, such as an open circuit in the leads 17 or 19 or a shorting out of one of the transducers 13 or 13a, would not produce any DC current. However, these failures provide readily detectible AC levels. For example, in normal operation as shown in FIG. 2, the two AC signals represented by the curves 113 and 113a would cancel each other out so that there would be no AC signal supplied to the failure detector 15. However, if no power were fed to the transducer 13 due to breaking of the lead 17 or other reasons, the failure detectors 15 would receive only the AC signal represented by the curve 113a, and this unopposed AC signal would be of a magnitude which is readily detectible by the threshold detector 49, i.e., it would be above the AC threshold. Similarly, if the transducer 13 were shorted out the AC signal represented by the curve 113 would greatly exceed the AC signal represented by the curve 113a. While this would produce no DC offset, the large AC signal from the lead 17 would be only partially "bucked out" by the AC signal from the transducer 13a. Consequently, the relatively large AC current signal from the lead 17 would be detected by the threshold detector 49.

Assuming that the impedances of the transducers 13 and 13a are not perfectly matched, then the resistance of the sensing resistor 47 should be substantially less than the impedance of either of the transducers 13 and 13a. This assures that the sensing resistor 47 will have a negligible effect on the accuracy of the transducer signals, i.e., the signals resulting from displacement of the cores 27 and 27a. For example, if the impedances of the transducers 13 and 13a are matched to within plus or minus 5%, then the resistance of the sensing resistor 47 may be from about 5 to about 15% of the impedance of either of the transducers.

Solely by way of example and not by way of limitation, in one embodiment, each of the power sources 21 and 21a provides 26 milliamps at 26 volts AC, each transducer 13 and 13a has an output of 200 microamps and an AC impedance of 1000 ohms, and the sensing resistor has a resistance of 100 ohms. ·

Although an exemplary embodiment of this invention has been shown and described, many changes, modifications and substitutions may be made by one having ordinary skill in the art without necessarily departing from the spirit and scope of this invention.

I claim:

1. A fault detection system for transducers comprising:

first aand second transducers, each of said transducers being adapted to receive alternating current;

said first transducer including means responsive to a first variable condition for providing a first direct current signal which varies with said first variable condition;

a common conductor;

means for coupling the common conductor to said first and second transducers whereby said first direct current signal can be applied to the common conductor;

the alternating current from said first and second transducers tending to cancel each other out during normal operation of the first and second transducers whereby the current amplitude on said common conductor is relatively low under normal operation of the first and second transducers and increases at least to a predetermined amplitude in response to a failure of one of said first and second transducers;

said first direct current signal being of a lower amplitude than said predetermined direct current amplitude; and failure detection means coupled to said common conductor and responsive to the current amplitude on said common conductor being at least at said predetermined amplitude to provide a failure signal.

2. A fault detection system as defined in claim 1 including first and second alternating current sources coupled, respectively, to said first and second transducers, the voltage of the power provided by each of said sources being substantially equal.

3. A fault detection system as defined in claim 2 wherein the alternating current provided by each of said sources is substantially oppositely phased.

4. A fault detection system as defined in claim 1 wherein said failure detection means is directly coupled to said common conductor.

5. A fault detection system as defined in claim 1 wherein each of said first and second transducers has two conductors leading to such transducers.

6. A fault detection system as defined in claim 1 wherein said failure detection means includes a sensing resistor coupled to the common conductor and means coupled to the common conductor and responsive to the voltage drop across said sensing resistor reaching a predetermined magnitude for providing said failure signal.

7. A fault detection system as defined in claim 6 wherein the resistance of said sensing resistor is substantially less than the impedance of either of said transducers.

8. A fault detection system as defined in claim 1, wherein said predetermined amplitude includes a predetermined alternating current amplitude, said failure detection means being responsive to either of said predetermined direct current or predetermined alternating current amplitudes to provide a failure signal.

9. A fault detection system as defined in claim 1 wherein said first variable condition is the position of a movable element and said means of said first transducer is responsive to the position of the movable element.

10. A fault detection system for transducers comprising:

first and second transducers, each of said transducers being adapted to receive electrical power;

said first transducer including means responsive to a first variable condition for providing a first current signal which varies with said first variable condition, the first current signal being smaller than the current required to power said first transducer;

said second transducer including means responsive to a second variable condition for providing a second current signal which varies with said second variable condition, the second current signal being smaller than the current required to power said second transducer;

first means coupled to said first transducer and responsive to the first current signal for providing a detection signal related to said first variable condition;

second means coupled to said second transducer and responsive to the second current signal for providing a detection signal related to the second variable condition;

a failure detector coupled to said first and second transducers whereby the failure detector is coupled to receive current from the first and second transducers, the current from said first and second transducers tending to cancel each other out during normal operation of the transducers whereby the current at the failure detector increases at least to a predetermined level in response to a failure of one of the transducers; and said failure detector including means responsive to the current being at least at said predetermined level for providing a failure signal.

11. A fault detection system as defined in claim 10 including means for supplying alternating current to said first and second transducers, the alternating current from said first and second transducers being substantially oppositely phased, a common conductor coupled to said first and second transducers and to said failure detector whereby the current level on said common conductor is relatively low during normal operation and increases to at least said predetermined level upon the occurrence of said failure, said means for providing a failure signal being directly coupled to said common conductor.

* * * * *